United States Patent
Huang et al.

(10) Patent No.: US 10,341,924 B2
(45) Date of Patent: Jul. 2, 2019

(54) PRIMARY SECONDARY CELL CHANGE METHOD AND BASE STATION

(71) Applicant: Huawei Technologies Co., Ltd., Shenzhen (CN)

(72) Inventors: Qufang Huang, Shanghai (CN); Hongping Zhang, Shanghai (CN); Mingzeng Dai, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 97 days.

(21) Appl. No.: 14/564,936

(22) Filed: Dec. 9, 2014

(65) Prior Publication Data
US 2015/0092750 A1 Apr. 2, 2015

Related U.S. Application Data

(63) Continuation of application No. PCT/CN2013/077746, filed on Jun. 24, 2013.

(30) Foreign Application Priority Data

Jun. 28, 2012 (CN) .......................... 2012 1 0218817

(51) Int. Cl.
*H04W 36/08* (2009.01)
*H04W 36/28* (2009.01)
(Continued)

(52) U.S. Cl.
CPC ....... *H04W 36/28* (2013.01); *H04W 36/0069* (2018.08); *H04W 36/08* (2013.01); *H04W 12/04* (2013.01); *H04W 72/0413* (2013.01)

(58) Field of Classification Search
CPC . H04W 36/28; H04W 72/0413; H04W 36/08; H04W 72/04; H04W 12/04
See application file for complete search history.

(56) References Cited

U.S. PATENT DOCUMENTS

2011/0300872 A1 12/2011 Lim et al.
2012/0302245 A1* 11/2012 Huang .............. H04W 36/0027
455/438
(Continued)

FOREIGN PATENT DOCUMENTS

CN 102083153 A * 6/2011 ............ H04W 36/08
CN 102083153 A 6/2011
(Continued)

OTHER PUBLICATIONS

3GPP TSG-RAN R2-103546, Jul. 2010, Handover Considerations in CA, 3GPP WG2 meeting #70.*
(Continued)

*Primary Examiner* — Lakeram Jangbahadur
(74) *Attorney, Agent, or Firm* — Oblon, McClelland, Maier & Neustadt, L.L.P.

(57) ABSTRACT

Embodiments of the present invention disclose a primary secondary cell change method and a base station. The primary secondary cell change method in the embodiments of the present invention includes: determining, by a primary base station, to change a first primary secondary cell served by a secondary base station, and selecting a second primary secondary cell from cells served by the secondary base station; sending, by the primary base station, a first message to the secondary base station, which is used to request the secondary base station to change the primary secondary cell, where the first message includes an identity of the second primary secondary cell; and sending, by the primary base station, a second message to a user equipment UE, which is used to request the UE to use the second primary secondary cell.

10 Claims, 7 Drawing Sheets

(51) Int. Cl.
*H04W 36/00* (2009.01)
*H04W 12/04* (2009.01)
*H04W 72/04* (2009.01)

(56) References Cited

U.S. PATENT DOCUMENTS

| | | | | |
|---|---|---|---|---|
| 2013/0163454 A1* | 6/2013 | Liang | | H04W 24/10 370/252 |
| 2013/0165124 A1* | 6/2013 | Liang | | H04W 36/0061 455/437 |
| 2013/0183970 A1* | 7/2013 | Chen | | H04W 36/30 455/436 |
| 2013/0194981 A1* | 8/2013 | Wang | | H04L 1/1671 370/280 |
| 2013/0215772 A1* | 8/2013 | Kaur | | H04W 36/0072 370/252 |

FOREIGN PATENT DOCUMENTS

| | | |
|---|---|---|
| CN | 102238666 A | 11/2011 |
| CN | 102421149 A | 4/2012 |
| EP | 2584812 A1 | 4/2013 |
| EP | 2605590 A1 | 6/2013 |
| EP | 2621218 A1 | 7/2013 |
| KR | 20120007410 A | 1/2012 |
| WO | WO 2011162134 A1 | 12/2011 |
| WO | WO 2012008739 A2 | 1/2012 |
| WO | WO 2012019549 A1 | 2/2012 |
| WO | WO 2012024035 A1 | 2/2012 |
| WO | WO 2012041044 A1 | 4/2012 |

OTHER PUBLICATIONS

"Discussion on Special Scell (SPcell) change procedure," 3GPP TSG RAN WG2 Meeting #85, Prague, Czech Republic, R2-140749, $3^{rd}$ Generation Partnership Project, Valbonne, France (Feb. 10-14, 2014).
"Handover Considerations in CA," 3GPP TSG-RAN WG2 Meeting #70bis, Stockholm, Sweden, R2-103546, pp. 1-2, $3^{rd}$ Generation Partnership Project, Valbonne, France (Jun. 28-Jul. 2, 2010).
"Primary Cell Change," 3GPP TSG-RAN WG2 #71, Madrid, Spain, R2-104319, pp. 1-2, $3^{rd}$ Generation Partnership Project, Valbonne, France (Aug. 23-27, 2010).
"Pcell and Scell candidate sets," 3GPP TSG RAN WG2 Meeting #70bis, Stockholm, Sweden, R2-103526, $3^{rd}$ Generation Partnership Project, Valbonne, France (Jun. 28-Jul. 2, 2010).
"Delta Configuration for reconfiguration and handover," TSG-RAN WG2#71, Madrid, Spain, R2-104790, $3^{rd}$ Generation Partnership Project, Valbonne, France (Aug. 23-26, 2010).
"Optimization on Intra-eNB Pcell Change Procedure," 3GPP TSG-RAN WG2#71, Madrid, Spain, R2-104421, $3^{rd}$ Generation Partnership Project, Valbonne, France (Aug. 23-27).
3GPP TS 36.300 V11.1.0 (Mar. 2012), Technical Specification, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 194 pages.

* cited by examiner

PRIMARY SECONDARY CELL CHANGE METHOD AND BASE STATION

CROSS-REFERENCE TO RELATED APPLICATIONS

This application is a continuation of International Patent Application No. PCT/CN2013/077746, filed on Jun. 24, 2013, which claims priority to Chinese Patent Application No. 201210218817.7, filed on Jun. 28, 2012, both of which are hereby incorporated by reference in their entireties.

TECHNICAL FIELD

The present invention relates to the communications field, and in particular, to a primary secondary cell change method and a base station.

BACKGROUND

With the development of mobile communications systems, the mobile communications systems can provide increasingly higher transmission rates and better service quality for the users. The users, on the other hand, also have increasingly higher requirements on the transmission rates. To ensure the high rates for most users and to provide higher throughputs for certain users without significantly increasing the configured bandwidth, a carrier aggregation (CA) technology is introduced by the 3rd Generation Partnership Project (3GPP for short). Carrier aggregation means that a user equipment (UE) can use multiple component carriers (CC) simultaneously for both uplink and downlink communications, so as to support the high-speed data transmission. When the rate of a UE decreases, some component carriers may be released with only one resident carrier retained, and the released resources can be used by another user, thereby achieving an objective of flexible and dynamic configuration.

During the carrier aggregation, a primary cell (P-Cell) undertakes work such as security, handovers and bearing of a physical uplink control channel, another cell that participates in the aggregation is referred to as a member cell (Secondary Cell, S-Cell for short), and a member cell only undertakes data transmission work, which is not related to security or handover. For cell aggregation inside a base station, there is only one P-Cell, which bears physical uplink control channels of all aggregated cells. For cell aggregation among base stations, each base station uses its own primary cell. However, a UE management function such as handover management and security control can be undertaken only by a primary cell of one base station. Therefore, a primary cell of another base station is referred to as a primary secondary cell and marked as PCell*. Correspondingly, a base station (evolved NodeB, eNB for short) to which a PCell belongs is referred to as a primary base station (Primary evolved NodeB, PeNB for short), and another eNB to which a PCell* belongs is referred to as a secondary base station (SeNB). As a user equipment moves, the signal quality of the user equipment corresponding to cells also changes, and therefore signal quality of a PCell* is usually no longer reliable.

SUMMARY

A technical issue to be solved in embodiments of the present invention is to provide a primary secondary cell change method and a base station, which can adjust a primary secondary cell in a process of carrier aggregation, thereby improving the communication efficiency.

To solve the foregoing technical issue, one aspect of the present invention provides a primary secondary cell change method, including:

determining, by a primary base station, to change a first primary secondary cell served by a secondary base station, and selecting a second primary secondary cell from cells served by the secondary base station;

sending, by the primary base station, a first message to the secondary base station, which is used to request the secondary base station to change the primary secondary cell, where the first message includes an identity of the second primary secondary cell; and sending, by the primary base station, a second message to a user equipment UE, which is used to request the UE to use the second primary secondary cell.

Another aspect of the present invention provides a primary secondary cell change method, including:

determining, by a secondary base station, to change a first primary secondary cell served by the secondary base station, and selecting a second primary secondary cell from cells served by the secondary base station;

sending, by the secondary base station, a first message to a primary base station, which is used to indicate change of the primary secondary cell, where the first message includes an identity of the second primary secondary cell; and sending, by the secondary base station, a second message to the user equipment UE, so that the UE uses the second primary secondary cell.

Another aspect of the present invention provides a primary secondary cell change method, including:

determining, by a secondary base station, to change a first primary secondary cell served by the secondary base station, and selecting candidate primary secondary cells from cells served by the secondary base station; and sending, by the secondary base station, a first message to a primary base station, where the first message includes identities of the candidate primary secondary cells, so that the primary base station derives security keys K-eNB* for the candidate primary secondary cells and a user equipment UE uses a second primary secondary cell that is selected by the primary base station or by the secondary base station from the candidate primary secondary cells.

Still another aspect of the present invention provides a base station, including:

a determining unit, configured to determine to change a first primary secondary cell served by a secondary base station;

a selecting unit, configured to select a second primary secondary cell from cells served by the secondary base station; and a sending unit, configured to send a first message to the secondary base station, which is used to request the secondary base station to change the primary secondary cell, where the first message includes an identity of the second primary secondary cell; where:

the sending unit is further configured to send a second message to a user equipment, which is used to request the user equipment UE to use the second primary secondary cell.

Still another aspect of the present invention provides a base station, including:

a determining unit, configured to determine to change a first primary secondary cell served by a secondary base station;

a selecting unit, configured to select a second primary secondary cell from cells served by the secondary base station; and a sending unit, configured to send a first message to a primary base station, which is used to indicate change of the primary secondary cell, where the first message includes an identity of the second primary secondary cell; where:

the sending unit is further configured to send a second message to the user equipment UE, so that the UE uses the second primary secondary cell.

Still another aspect of the present invention provides a base station, including:

a determining unit, configured to determine to change a first primary secondary cell served by a secondary base station;

a selecting unit, configured to select candidate primary secondary cells from cells served by the secondary base station; and a sending unit, configured to send a first message to a primary base station, where the first message includes identities of the candidate primary secondary cells, so that the primary base station derives security keys K-eNB* for the candidate primary secondary cells and a user equipment UE uses a second primary secondary cell that is selected by the primary base station or by the secondary base station from the candidate primary secondary cells.

According to the primary secondary cell change method and the base station in the embodiments of the present invention, a primary base station determines to change a first primary secondary cell served by a secondary base station, and selects a second primary secondary cell from cells served by the secondary base station, and after the primary base station sends a second message to a user equipment (UE), the UE can use the second primary secondary cell. The technical solutions of the present invention can adjust a primary secondary cell in a process of carrier aggregation, thereby improving the communication efficiency.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
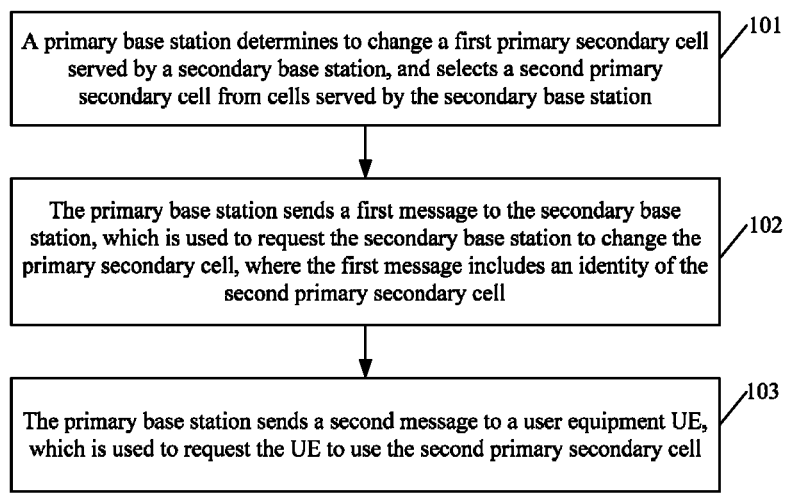
FIG. 1 is a first schematic flowchart of a primary secondary cell change method according to an embodiment of the present invention.

Embodiments of the present invention provide a primary secondary cell change method and a base station, which can adjust a primary secondary cell in a process of carrier aggregation, thereby improving the communication efficiency.

The following description, to illustrate rather than limit, provides specific details such as a particular system structure, an interface, and a technology, so as to facilitate thorough understanding of the present invention. However, it should be understood by a person skilled in the art that the present invention can also be implemented in other embodiments without the specific details. In other cases, detailed descriptions of well known apparatuses, circuits and methods are omitted, so that the present invention is described without being disturbed by the unnecessary details.

Various technologies described in this specification may be applied to various wireless communications systems, for example, current 2G and 3G communications systems and next-generation communications systems, for example, a Global System for Mobile Communications (Global System for Mobile communications, GSM for short), a Code Division Multiple Access (Code Division Multiple Access, CDMA for short) system, a Time Division Multiple Access (Time Division Multiple Access, TDMA for short) system, a Wideband Code Division Multiple Access (WCDMA) system, a Frequency Division Multiple Access (FDMA) system, an Orthogonal Frequency-Division Multiple Access (Orthogonal Frequency-Division Multiple Access, OFDMA for short) system, a single-carrier FDMA (SC-FDMA) system, a general packet radio service (General Packet Radio Service, GPRS for short) system, a Long Term Evolution (Long Term Evolution, LTE for short) system, and other such communications systems.

In this specification, various aspects are described with reference to a terminal and/or a base station and/or a base station controller.

A user terminal may be a wireless terminal or may be a wired terminal. The wireless terminal may refer to a device providing voice and/or data connectivity for a user, a handheld device with a wireless connection function, or another processing device connected to a wireless modem. The wireless terminal may communicate with one or more core networks by means of a radio access network (Radio Access Network, RAN for short). The wireless terminal may be a mobile terminal, such as a mobile phone (or referred to as a "cellular" phone) and a computer with a mobile terminal, and for example, may be a portable, pocket-sized, handheld, computer-embedded, or in-vehicle mobile apparatus, which exchanges voice and/or data with the radio access network. For example, the wireless terminal is a device such as a personal communication service (Personal Communication Service, PCS for short) phone, a cordless phone, a Session Initiation Protocol (SIP) phone, a wireless local loop (Wireless Local Loop, WLL for short) station, or a personal digital assistant (Personal Digital Assistant, PDA for short). The wireless terminal may also be referred to as a system, a subscriber unit (Subscriber Unit), a subscriber station (Subscriber Station), a mobile station (Mobile Station), a remote station (Remote Station), an access point (Access Point), a remote terminal (Remote Terminal), an access terminal (Access Terminal), a user terminal (User Terminal), a user agent (User Agent), a user terminal (User Device), or a user equipment (User Equipment).

The base station (for example, an access point) may refer to a device that communicates with a wireless terminal by using one or more sectors over an air interface on an access network. The base station can be configured to perform mutual conversion between a received over-the-air frame and an IP packet and serve as a router between the wireless terminal and the rest part of the access network, where the rest part of the access network may include an Internet Protocol (IP) network. The base station may also coordinate attribute management of the air interface. For example, the base station may be a base station (Base Transceiver Station, BTS for short) in GSM or CDMA, may also be a base station (NodeB) in WCDMA, or may also be an evolved base station (NodeB, eNB, or e-NodeB, evolved Node B) in LTE, which is not limited in the present invention.

In addition, the terms "system" and "network" in this specification may often be used interchangeably. The term "and/or" in this specification is only an association relationship for describing associated objects and represents that three relationships may exist. For example, A and/or B may represent the following three cases: A exists alone, both A and B exist, and B exists alone. In addition, the symbol "/" in this specification generally indicates an "or" relationship between associated objects before and after the symbol.

Embodiment 1

This embodiment provides a primary secondary cell change method. As shown in FIG. 1, the method includes:

Step 101: A primary base station determines to change a first primary secondary cell served by a secondary base station, and selects a second primary secondary cell from cells served by the secondary base station.

Figure 2:
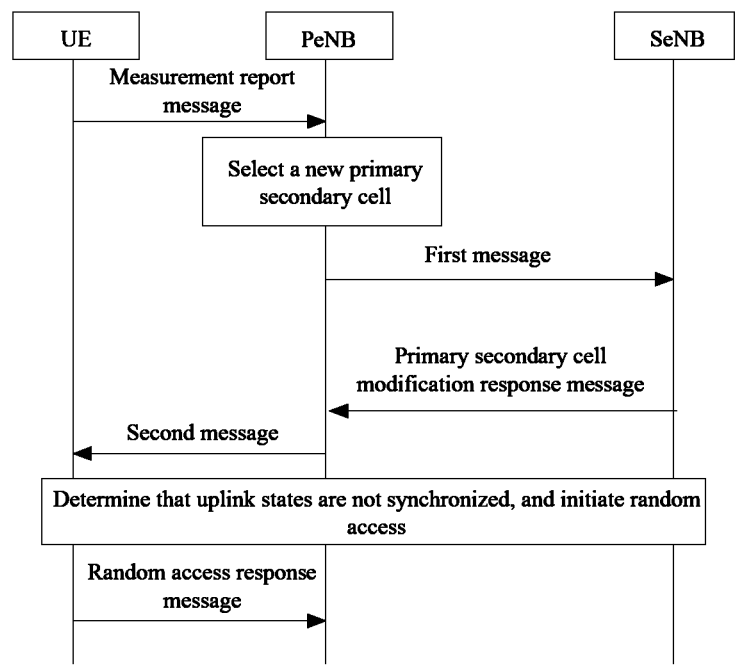
FIG. 2 is a schematic diagram of signaling interaction according to Embodiment 1 of the present invention.

As an implementation manner of the present invention, a UE constantly measures, according to a measurement configuration on a network side, radio signal quality of cells borne by an SeNB and reports a measurement result to a primary base station PeNB by using a measurement report message, and the primary base station receives the measurement report message from the UE, as shown in FIG. 2, where the measurement report message includes the measurement result of radio signal quality, which is measured by the UE, of the cells of the secondary base station.

The PeNB determines, according to the measurement result, in the measurement report message, of the radio signal quality measured by the UE, whether signal quality of an original PCell* of the SeNB, that is, the first primary secondary cell, is reliable. If the signal quality of the first primary secondary cell is still reliable, the first primary secondary cell continues to be used. If the PeNB finds that the signal quality of the original PCell* is no longer reliable, or if there is another reason, the PeNB needs to change the PCell* of the SeNB. The PeNB selects a new PCell*, that is, the second primary secondary cell, from the cells of the SeNB according to the measurement result. Exemplarily, the PeNB selects, from the cells of the SeNB, a cell having highest signal quality as the second primary secondary cell.

Further, after a new primary secondary cell is selected according to the measurement result, the method of this embodiment further includes:

allocating, by the primary base station and in the new primary secondary cell, a physical uplink control channel (Physical Uplink Control Channel, PUCCH for short) resource to the UE, and deriving a security key K-eNB* corresponding to the new primary secondary cell.

After the PeNB selects the new PCell* from the cells of the SeNB according to the measurement result, the PeNB further allocates, in the new PCell*, a PUCCH resource to the UE and derives the security key K-eNB* corresponding to the PCell*.

Step 102: The primary base station sends a first message to the secondary base station, which is used to request the secondary base station to change the primary secondary cell, where the first message includes an identity of the second primary secondary cell.

The PeNB sends a first message to the SeNB, so as to notify the SeNB that the second primary secondary cell selected by the primary base station is used as the new PCell*; and the secondary base station adjusts, according to the first message, the primary secondary cell in use to the second primary secondary cell, where the first message includes the identity of the second primary secondary cell.

Further, the first message further includes the PUCCH resource allocated by the PeNB and the security key K-eNB* derived by the PeNB. The first message carries the PUCCH resource, so that the new PCell* reserves the PUCCH resource for the UE. In addition, the first message may further include some other information, such as a user equipment identity (UE ID), so that the SeNB learns a user to which a configured PUCCH resource belongs.

Further, after the primary base station sends the first message to the secondary base station, and before the primary base station sends a second message to the UE, the method further includes:

receiving, by the primary base station, a primary secondary cell modification response message from the secondary base station.

After receiving the first message, the SeNB further sends a primary secondary cell modification response message to the PeNB to notify the PeNB that the secondary base station has received the first message and learned the new PCell*.

Step 103: The primary base station sends a second message to the UE, which is used to request the UE to use the second primary secondary cell.

Specifically, after receiving the primary secondary cell modification response message, the PeNB sends a second message to the UE, so that the UE changes a current PCell*, where the second message may specifically be a PCell* change instruction and the second message includes an identity of the new primary secondary cell and the PUCCH resource allocated by the PeNB. After receiving the second message, the UE can use the second primary secondary cell. It should be noted that the PeNB does not need to notify the UE of the derived security key K-eNB* because the UE is capable of completing derivation work by itself according to the UE ID to generate an identical K-eNB*.

Further, after the primary base station sends the second message to the UE, the method of this embodiment further includes:

determining, by the UE after receiving the second message, whether the UE is in an uplink synchronized state with the new primary secondary cell; and if not, initiating random access to the new primary secondary cell, so as to access the secondary base station.

After receiving the second message, that is, the PCell* change instruction, the UE may initiate or not initiate random access to the SeNB. Whether this step is needed depends on whether the UE is still in the uplink synchronized state with the new PCell*. If still uplink synchronized, there is no need to initiate random access; otherwise, random access is needed. After the UE successfully initiates random access to the new PCell*, the UE indicates, to the PeNB, that the second primary secondary cell takes effect, or the SeNB indicates, to the PeNB, that the second primary secondary cell takes effect; in this way, the UE can use the new PCell* to transmit control signaling.

According to the primary secondary cell change method of this embodiment, a PeNB first negotiates with an SeNB and selects a second primary secondary cell, then the SeNB reserves, in the second primary secondary cell, a PUCCH resource for a UE, and after the PeNB interacts with the UE, the UE can directly use a physical resource of the second primary secondary cell of the SeNB, thereby implementing real-time change of a primary secondary cell and improving the communication efficiency.

Embodiment 2

Figure 3:
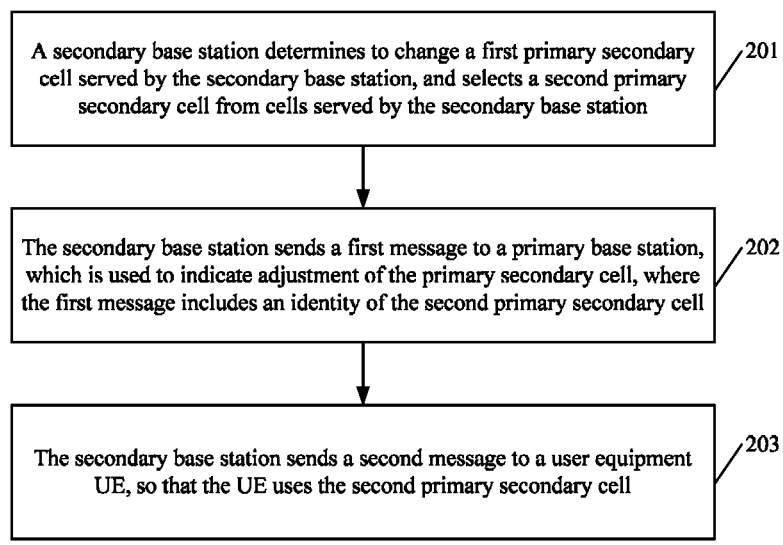
FIG. 3 is a second schematic flowchart of a primary secondary cell change method according to an embodiment of the present invention.

This embodiment provides a primary secondary cell change method. As shown in FIG. 3, the method includes:

Step 201: A secondary base station determines to change a first primary secondary cell served by the secondary base station, and selects a second primary secondary cell from cells served by the secondary base station.

Figure 4:
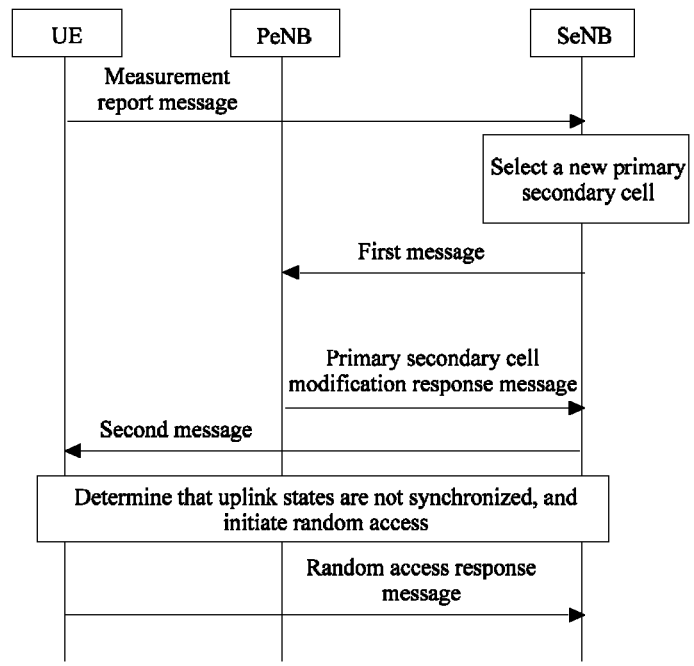
FIG. 4 is a schematic diagram of signaling interaction according to Embodiment 2 of the present invention.

As an implementation manner of the present invention, a UE constantly measures, according to a measurement configuration on a network side, radio signal quality of cells borne by an SeNB and reports a measurement result to the SeNB by using a measurement report message, and the SeNB receives the measurement report message from the UE, as shown in FIG. 4, where the measurement report message includes the measurement result of radio signal quality, which is measured by the UE, of the cells of the secondary base station.

The SeNB determines, according to the measurement result, in the measurement report message, of the radio signal quality measured by the UE, whether signal quality of an original PCell* of the SeNB, that is, the first primary secondary cell, is reliable. If the signal quality of the first primary secondary cell is still reliable, the first primary secondary cell continues to be used; if the SeNB finds that the signal quality of the original PCell* is no longer reliable, or if there is another reason, it is necessary to change the first primary secondary cell of the SeNB. The SeNB selects a new PCell*, that is, the second primary secondary cell, from the cells of the SeNB according to the measurement result. Exemplarily, the SeNB may select, from the cells, a cell having highest signal quality as the second primary secondary cell PCell*.

Further, after the second primary secondary cell is selected according to the measurement result, the method of this embodiment further includes:

allocating, by the secondary base station and in the new primary secondary cell, a PUCCH resource to the UE.

After the SeNB selects the new PCell* from the cells of the SeNB according to the measurement result, the SeNB further allocates, in the new PCell*, a PUCCH resource to the UE, so as to prepare for use of the second primary secondary cell by the UE.

Step 202: The secondary base station sends a first message to the primary base station, which is used to indicate change of the primary secondary cell, where the first message includes an identity of the second primary secondary cell.

The SeNB sends a first message to the PeNB, where the first message includes the identity of the second primary secondary cell, so that the PeNB learns the new PCell*. It should be noted that after receiving the first message, the PeNB may not need to derive a security key K-eNB* corresponding to the second primary secondary cell, but still uses a previous security key. In this way, the change procedure can be simplified, and because the previous security key is not transferred between the PeNB and the SeNB, high security is achieved.

In addition, after receiving the first message, the PeNB may derive the security key K-eNB* corresponding to the second primary secondary cell. In this case, the first message needs to include security key request information, so that the PeNB derives the security key K-eNB* corresponding to the second primary secondary cell. In addition, the first message may further include some other information, such as a user equipment identity (UE ID).

Further, after the secondary base station sends the first message to the primary base station, and before the secondary base station sends a second message to the UE, the method further includes:

receiving, by the secondary base station, a primary secondary cell modification response message from the primary base station.

After receiving the first message, the PeNB further sends a primary secondary cell modification response message to the SeNB to notify the secondary base station that the PeNB has received the first message and learned the new PCell*. Further, if the first message includes the security key request information, the primary secondary cell modification response message further includes the security key K-eNB* that is derived by the PeNB and corresponds to the second primary secondary cell.

Step 203: The secondary base station sends a second message to the UE, so that the UE uses the second primary secondary cell.

Specifically, after receiving the primary secondary cell modification response message, the SeNB sends a second message to the UE, so that the UE changes a current PCell*, where the second message includes the identity of the second primary secondary cell and the PUCCH resource allocated by the SeNB. Once receiving the second message, the UE can use the second primary secondary cell. It should be noted that if the PeNB derives the security key K-eNB* corresponding to the second primary secondary cell, the UE derives the security key by itself according to the UE ID after receiving the second message.

Further, after the secondary base station sends the second message to the UE, the method of this embodiment further includes:

determining, by the UE after receiving the second message, whether the UE is in an uplink synchronized state with the second primary secondary cell; and if not, initiating random access to the second primary secondary cell, so as to access the secondary base station.

After receiving the second message, the UE may initiate or not initiate random access to the SeNB. Whether this step is needed depends on whether the UE is still in the uplink synchronized state in the new PCell*. If still uplink synchronized, there is no need to initiate random access; otherwise, random access is needed. After the UE successfully initiates random access to the new PCell*, the UE indicates, to the SeNB, that the new PCell* takes effect, or the PeNB indicates, to the SeNB, that the new PCell* takes effect; in this way, the UE can use the second primary secondary cell to transmit control signaling.

According to the primary secondary cell change method of this embodiment, an SeNB selects a new PCell* according to a measurement result of radio signal quality reported by a UE, then the SeNB reserves, in the new Pcell*, a PUCCH resource for the UE, and after the SeNB interacts with the UE, the UE can directly use a physical resource of the new Pcell* of the SeNB, thereby implementing real-time change of a primary secondary cell and improving the communication efficiency.

Embodiment 3

Figure 5:
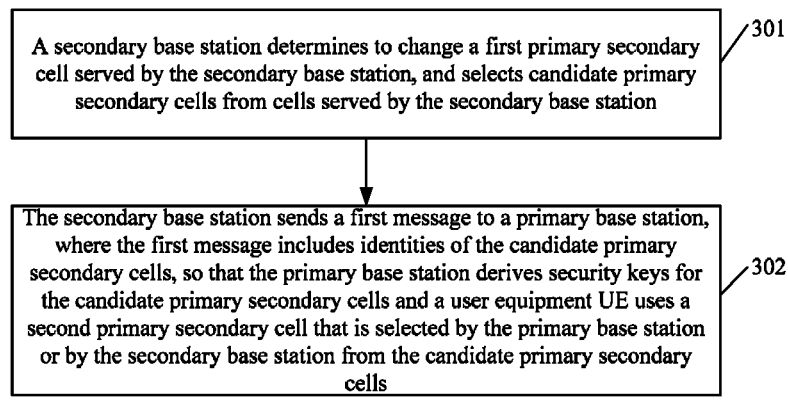
FIG. 5 is a third schematic flowchart of a primary secondary cell change method according to an embodiment of the present invention.

This embodiment provides a primary secondary cell change method. As shown in FIG. 5, the method includes:

Step 301: A secondary base station determines to change a first primary secondary cell served by the secondary base station, and selects candidate primary secondary cells from cells served by the secondary base station.

As an implementation manner of the present invention, a UE constantly measures, according to a measurement configuration on a network side, radio signal quality of cells borne by an SeNB and reports a measurement result to the SeNB by using a measurement report message, and the SeNB receives the measurement report message from the UE, where the measurement report message includes the measurement result of radio signal quality, which is measured by the UE, of the cells of the secondary base station.

The SeNB determines, according to the measurement result, in the measurement report message, of the radio signal quality measured by the UE, whether signal quality of an original PCell* of the SeNB, that is, the first primary secondary cell, is reliable. If the signal quality of the first primary secondary cell is still reliable, the first primary secondary cell continues to be used; if the SeNB finds that the signal quality of the original PCell* is no longer reliable, or if there is another reason, it is necessary to change the first primary secondary cell of the SeNB. The SeNB selects, according to the measurement result, a plurality of PCells* from the cells of the SeNB as candidate primary secondary cells. Exemplarily, the SeNB may select, from the cells according to signal quality, a plurality of PCells* having relatively good signal quality.

Figure 6:
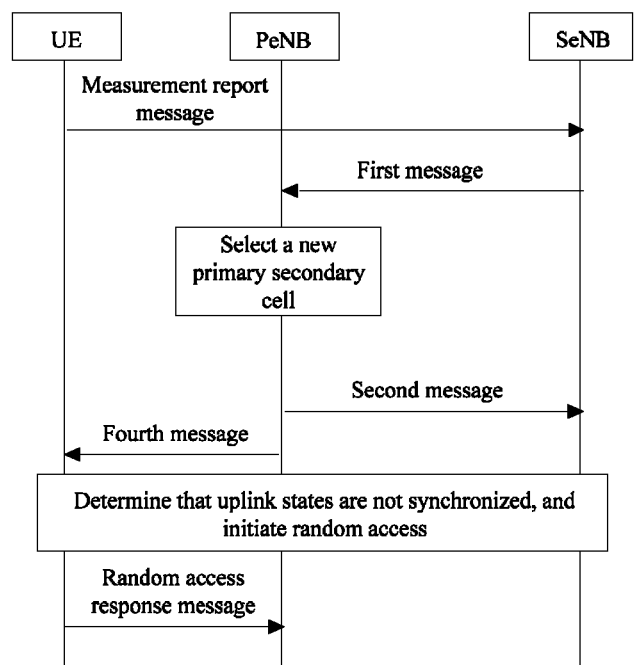
FIG. 6 is a first schematic diagram of signaling interaction according to Embodiment 3 of the present invention.

Further, as an implementation manner of the present invention, as shown in FIG. 6, after a plurality of candidate primary secondary cells is selected from the cells of the secondary base station according to the measurement result, the method of this embodiment further includes:

allocating, by the secondary base station, PUCCH resources to the candidate primary secondary cells.

The first message further includes the PUCCH resources that are allocated by the secondary base station to the candidate primary secondary cells.

After selecting, according to the measurement result, a plurality of PCells* from the cells of the SeNB as candidate primary secondary cells, the SeNB allocates a PUCCH resource to each of the selected candidate primary secondary cells, and sends the allocated PUCCH resources and identities of the candidate primary secondary cells to a primary base station by using a first message.

Step 302: The secondary base station sends a first message to the primary base station, where the first message includes identities of the candidate primary secondary cells, so that the primary base station derives security keys K-eNB* for the candidate primary secondary cells and a user equipment UE uses a second primary secondary cell that is selected by the primary base station or by the secondary base station from the candidate primary secondary cells.

As an implementation manner of the present invention, as shown in FIG. 6, separately deriving, by the primary base station, security keys K-eNB* for one or more of the candidate primary secondary cells includes:

selecting, by the primary base station, a new primary secondary cell from the plurality of candidate primary secondary cells, and deriving a security key K-eNB* for the new primary secondary cell.

After receiving the first message, the primary base station first selects a cell from the plurality of candidate primary secondary cells as the new primary secondary cell, derives the security key K-eNB* for the new primary secondary cell, and then notifies the secondary base station of the selected new primary secondary cell and the corresponding security key K-eNB* by using a second message.

Figure 7:
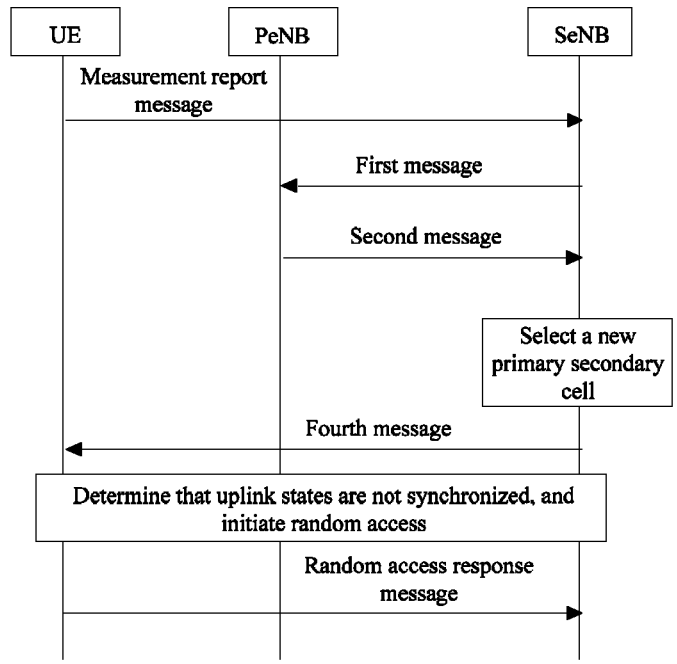
FIG. 7 is a second schematic diagram of signaling interaction according to Embodiment 3 of the present invention.

As another implementation manner of the present invention, as shown in FIG. 7, after receiving the first message, the primary base station derives a security key K-eNB* separately for each of the candidate primary secondary cells and then notifies, by using a second message, the secondary base station of the security keys K-eNB* corresponding to the candidate primary secondary cells. The secondary base station receives the second message sent by the primary base station, where the second message includes the security keys K-eNB* of the candidate primary secondary cells; and selects a cell from the candidate primary secondary cells as a new primary secondary cell. In addition, after the secondary base station selects the new primary secondary cell from the candidate primary secondary cells, the method further includes:

allocating, by the secondary base station and in the new primary secondary cell, a PUCCH resource to the UE, so that the UE can use the new primary secondary cell.

The secondary base station or the primary base station sends a fourth message to the UE, so that the UE uses the new primary secondary cell.

As an implementation manner of the present invention, as shown in FIG. 7, the secondary base station sends a fourth message to the UE, so that the UE uses the new primary secondary cell, where the fourth message includes an identity of the new primary secondary cell and the allocated PUCCH resource.

In addition, as shown in FIG. 6, the primary base station may also send a fourth message to the UE.

Further, after the secondary base station sends the fourth message to the UE, the method of this embodiment further includes:

determining, by the UE after receiving the fourth message, whether the UE is in an uplink synchronized state with the new primary secondary cell; and if not, initiating random access to the new primary secondary cell, so as to access the secondary base station.

After receiving the fourth message, the UE may initiate or not initiate random access to the SeNB. Whether this step is needed depends on whether the UE is still in the uplink synchronized state in the new PCell*. If still uplink synchronized, there is no need to initiate random access; otherwise, random access is needed. After successfully initiating random access to the new PCell*, the UE can use the new PCell* to transmit control signaling.

According to the primary secondary cell change method of this embodiment, a secondary base station determines to change a first primary secondary cell served by the secondary base station, and selects candidate primary secondary cells from cells served by the secondary base station, and after the secondary base station sends a first message to a primary base station, a UE can use a second primary secondary cell that is selected by the primary base station or by the secondary base station from the candidate primary secondary cells, thereby implementing real-time change of a primary secondary cell and improving the communication efficiency.

Embodiment 4

Figure 8:
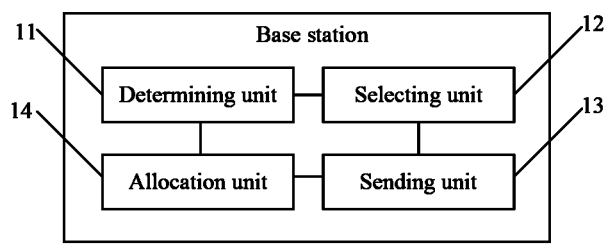
FIG. 8 is a first schematic diagram of a base station according to an embodiment of the present invention.

Corresponding to Embodiment 1, this embodiment further provides a base station, as shown in FIG. 8, including:

a determining unit 11, configured to determine to change a first primary secondary cell served by a secondary base station;

a selecting unit 12, configured to select a second primary secondary cell from cells served by the secondary base station; and a sending unit 13, configured to send a first message to the secondary base station, which is used to request the secondary base station to change the primary secondary cell, where the first message includes an identity of the second primary secondary cell; where:

the sending unit 13 is further configured to send a second message to a user equipment, which is used to request the user equipment UE to use the second primary secondary cell.

Further, the base station further includes:

an allocation unit 14, configured to allocate, in the second primary secondary cell, a physical uplink control channel PUCCH resource to the UE.

Further, the first message further includes:

the PUCCH resource, so that the second primary secondary cell reserves the PUCCH resource for the UE.

Further, the first message further includes: a security key K-eNB* that is derived by the primary base station and corresponds to the second primary secondary cell.

According to a base station of this embodiment, a PeNB first negotiates with an SeNB and selects a new PCell*, then the SeNB reserves, in the new pcell*, a PUCCH resource for a UE, and after the PeNB interacts with the UE, the UE can directly use a physical resource of the new Pcell* of the SeNB, thereby implementing real-time change of a primary secondary cell and improving the communication efficiency.

Figure 9:
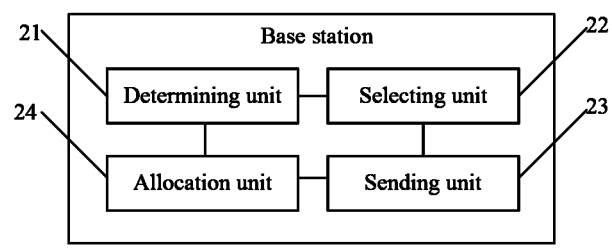
FIG. 9 is a second schematic diagram of a base station according to an embodiment of the present invention.

Corresponding to Embodiment 2, an embodiment further provides a base station, as shown in FIG. 9, including:

a determining unit 21, configured to determine to change a first primary secondary cell served by a secondary base station;

a selecting unit 22, configured to select a second primary secondary cell from cells served by the secondary base station; and a sending unit 23, configured to send a first message to a primary base station, which is used to indicate change of the primary secondary cell, where the first message includes an identity of the second primary secondary cell; where:

the sending unit 23 is further configured to send a second message to the user equipment UE, so that the UE uses the second primary secondary cell.

Further, the base station further includes:

an allocation unit 24, configured to allocate, in the second primary secondary cell, a physical uplink control channel PUCCH resource to the UE.

Further, the first message further includes:

security key request information, so that the primary base station derives a security key K-eNB* corresponding to the second primary secondary cell.

According to a base station of this embodiment, an SeNB selects a new PCell* according to a measurement result of radio signal quality reported by a UE, then the SeNB reserves, in the new pcell*, a PUCCH resource for the UE, and after the SeNB interacts with the UE, the UE can directly use a physical resource of the new Pcell* of the SeNB, thereby implementing real-time change of a primary secondary cell and improving the communication efficiency.

Figure 10:
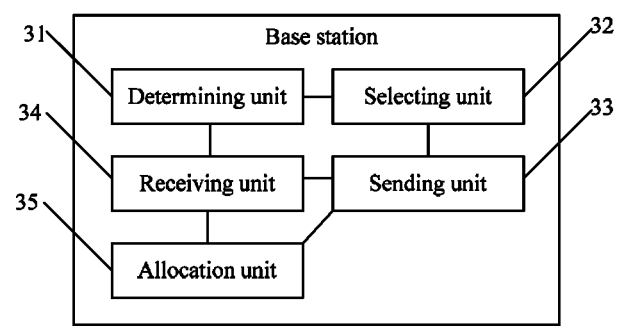
FIG. 10 is a third schematic diagram of a base station according to an embodiment of the present invention.

Corresponding to Embodiment 3, an embodiment further provides a base station, as shown in FIG. 10, including:

a determining unit 31, configured to determine to change a first primary secondary cell served by a secondary base station;

a selecting unit 32, configured to select candidate primary secondary cells from cells served by the secondary base station; and a sending unit 33, configured to send a first message to a primary base station, where the first message includes identities of the candidate primary secondary cells, so that the primary base station derives security keys K-eNB* for the candidate primary secondary cells and a user equipment UE uses a second primary secondary cell that is selected by the primary base station or by the secondary base station from the candidate primary secondary cells.

Further, the first message further includes physical uplink control channel PUCCH resources that are allocated by the secondary base station to the candidate primary secondary cells.

Further, the base station further includes:

a receiving unit 34, configured to receive a second message sent by the primary base station, where the second message includes the security keys K-eNB* of the candidate primary secondary cells.

Further, the selecting unit 32 is further configured to select a second primary secondary cell from the candidate primary secondary cells.

The base station further includes:

an allocation unit 35, configured to allocate, in the second primary secondary cell, a PUCCH resource to the UE.

A base station of this embodiment determines to change a first primary secondary cell served by a secondary base station, and selects candidate primary secondary cells from cells served by the secondary base station, and after the secondary base station sends a first message to a primary base station, a UE can use a second primary secondary cell that is selected by the primary base station or by the secondary base station from the candidate primary secondary cells, thereby implementing real-time change of a primary secondary cell and improving the communication efficiency.

The base station in the foregoing embodiment may also be implemented by using another hardware structure. For example, the receiving unit in the foregoing embodiment may be executed by a receiver, the sending unit may be executed by a transmitter, and other units may be all executed by a processor.

It can be clearly understood by a person skilled in the art that, for the purpose of convenient and brief description, the division of the foregoing functional modules is merely used as an example for description, and in actual applications, the foregoing functions may be allocated to and implemented by different modules according to a requirement, that is, the internal structure of the apparatus is divided into different functional modules to implement all or a part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one place, or may be distributed to a plurality of network units. A part or all of the units may be selected according to an actual requirement to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device) or a processor (processor) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art without departing from the technical scope disclosed in the present invention shall fall within the protection scope of the present invention. Therefore, the protection scope of the present invention shall be subject to the protection scope of the claims.

What is claimed is:

1. A method, comprising:
supplying, by a secondary base station, service to a terminal through a first secondary cell (S-Cell) used as a primary S-Cell, wherein the service is simultaneously supplied by a primary base station through a primary cell (P-Cell) for the terminal, and the secondary base station comprises the first S-Cell used as the primary S-cell for the terminal and a second S-Cell;
receiving, by the secondary base station, a measure report from the terminal; and
selecting, by the secondary base station, the second S-Cell as the primary S-Cell according to the measure report;
updating, by the secondary base station, the primary S-Cell for the terminal from the first S-Cell to the second S-Cell;
sending, by the secondary base station, a message to the terminal, the message indicating change of the primary S-Cell for the terminal from the first S-Cell to the second S-Cell; and
supplying, by the secondary base station, the service to the terminal through the second S-Cell as the primary S-Cell, while the service is simultaneously supplied by the primary base station through the same P-Cell for the terminal,
wherein the P-Cell and the primary S-Cell are separately configured to simultaneously supply a physical uplink control channel (PUCCH) for the terminal.

2. The method according to claim 1, further comprising:
allocating, by the secondary base station, a PUCCH resource to the terminal in the second S-Cell.

3. The method according to claim 1, further comprising:
sending, by the secondary base station, identification information of the second S-Cell to the terminal.

4. A base station, comprising:
at least one processor configured to:
supply service to a terminal through a first secondary cell (S-Cell) used as a primary S-Cell, wherein the service is simultaneously supplied by another base station through a primary cell (P-Cell) for the terminal, and the base station comprises the first S-Cell used as the primary S-cell for the terminal and a second S-Cell; and
receive a measure report from the terminal; and
select the second S-Cell as the primary S-Cell according to the measure report;
update the primary S-Cell for the terminal from the first S-Cell to the second S-Cell; and
a transmitter configured to:
send a signal to the terminal, the signal indicating change of the primary S-Cell for the terminal from the first S-Cell to the second S-Cell,
wherein the at least one processor is further configured to:
supply the service to the terminal through the second S-Cell as the primary S-Cell, while the service is simultaneously supplied by the another base station through the same P-Cell for the terminal,
wherein the P-Cell and the primary S-Cell are separately configured to simultaneously supply a physical uplink control channel (PUCCH) for the terminal.

5. The base station according to claim 4, wherein the at least one processor is further configured to allocate a PUCCH resource to the terminal in the second S-Cell.

6. The base station according to claim 4, wherein the transmitter is further configured to send identification information of the second S-Cell to the terminal.

7. A method comprising:
accessing, by an apparatus, service to the apparatus simultaneously supplied by a primary base station through a primary cell (P-Cell) and a secondary base station through a first secondary cell (S-Cell) used as a primary S-Cell, the secondary base station comprising the first S-Cell used as the primary S-cell for the apparatus and a second S-Cell;
sending, by the apparatus, a measure report to the secondary base station;
receiving, by the apparatus, a message from the secondary base station, the message indicating change of the primary S-Cell for the apparatus from the first S-Cell to the second S-Cell, and the change of the primary S-Cell for the apparatus being determined by the secondary base station based on the measure report; and accessing, by the apparatus, the service to the apparatus simultaneously supplied by the primary base station through the same P-Cell and the secondary base station through the second S-Cell as the primary S-Cell;

wherein the P-Cell and the primary S-Cell are separately configured to simultaneously supply a physical uplink control channel (PUCCH) for the apparatus.

8. The method according to claim 7, further comprising:

receiving, by the apparatus, an identification information of the second S-Cell from the secondary base station.

9. An apparatus comprising:

at least one processor configured to:

access service to the apparatus simultaneously supplied by a primary base station through a primary cell (P-Cell) and a secondary base station through a first secondary cell (S-Cell) used as a primary S-Cell, the secondary base station comprising the first S-Cell used as the primary S-cell for the apparatus and a second S-Cell;

send a measure report to the secondary base station;

receive a message from the secondary base station, the message indicating change of the primary S-Cell for the apparatus from the first S-Cell to the second S-Cell, and the change of the primary S-Cell for the apparatus being determined by the secondary base station based on the measure report; and access the service to the apparatus simultaneously supplied by the primary base station through the same P-Cell and the secondary base station through the second S-Cell as the primary S-Cell; and a memory coupled to the at least one processor, wherein the P-Cell and the primary S-Cell are separately configured to simultaneously supply a physical uplink control channel for the apparatus.

10. The apparatus according to claim 9, wherein the at least one processor is further configured to receive an identification information of the second S-Cell from the secondary base station.

* * * * *